United States Patent
Kondo

(10) Patent No.: US 9,086,169 B2
(45) Date of Patent: Jul. 21, 2015

(54) ELECTROMAGNETIC SPOOL VALVE

(71) Applicant: DENSO CORPORATION, Kariya, Aichi-pref. (JP)

(72) Inventor: Jiro Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 114 days.

(21) Appl. No.: 13/949,841

(22) Filed: Jul. 24, 2013

(65) Prior Publication Data

US 2014/0041742 A1    Feb. 13, 2014

(30) Foreign Application Priority Data

Aug. 11, 2012  (JP) ................................. 2012-179121

(51) Int. Cl.
*F16K 31/06* (2006.01)
*F16K 27/04* (2006.01)

(52) U.S. Cl.
CPC ........... *F16K 31/0603* (2013.01); *F16K 27/048* (2013.01); *F16K 31/0613* (2013.01); *F16K 31/0675* (2013.01)

(58) Field of Classification Search
CPC ............ F16K 31/0603; F16K 31/0613; F16K 11/0708; F16K 31/04; F16K 27/048; F16K 31/0675
USPC .................. 137/312, 625, 69, 625.68, 625.65
See application file for complete search history.

(56) References Cited

U.S. PATENT DOCUMENTS

| 4,566,479 | A  | * | 1/1986  | Rotte et al. ..................... 137/312 |
| 4,655,254 | A  | * | 4/1987  | Hafner et al. ............. 137/625.65 |
| 7,121,523 | B2 | * | 10/2006 | Adams et al. .................. 137/312 |
| 8,456,262 | B2 | * | 6/2013  | Kondo ........................... 335/220 |

FOREIGN PATENT DOCUMENTS

JP    2003-097756    4/2003

* cited by examiner

*Primary Examiner* — Kevin Lee
(74) *Attorney, Agent, or Firm* — Nixon & Vanderhye P.C.

(57) ABSTRACT

Drain oil is discharged into an oil drain passage from an advance angle port and discharge port, or from a delay angle port and discharge port; the drain oil may be mixed with foreign matter. The flow of such foreign matter accompanying the drain oil, even if flowing toward an electromagnetic actuator, can be hindered from reaching a high magnetic flux density portion by each of a pipe, a hollow shaft, and a collar. The high magnetic flux density portion, which is easy to be affected by influence of the foreign matter, can be prevented from suffering from the arrival of the foreign matter; this prevents an occurrence of the slide abrasion and/or the slide defect of a plunger, improving the reliability of an oil control valve.

6 Claims, 4 Drawing Sheets

ELECTROMAGNETIC SPOOL VALVE

CROSS REFERENCE TO RELATED APPLICATION

The present application is based on Japanese Patent Application No. 2012-179121 filed on Aug. 11, 2012, the disclosure of which is incorporated herein by reference.

TECHNICAL FIELD

The present disclosure relates to an electromagnetic spool valve which combines a spool valve and an electromagnetic actuator (linear solenoid) in an axial direction and, in particular, an electromagnetic spool valve in which the space gaps facing both the sides of a plunger in the axial direction each communicate with a drain space via an interior of a spool.

BACKGROUND ART

[Patent Literature 1] JP 2003-97756 A

Patent Literature 1 describes an electromagnetic spool valve in which the space gaps facing both the sides of the plunger in the axial direction each communicate with a drain space via an oil drain passage inside of a spool. The spool valve combines a spool valve and an electromagnetic actuator in the axial direction, and has an oil drain passage (passage hole along the axial direction), which communicates with the drain space, in a central part of a spool. The space gaps facing both the sides of the plunger in the axial direction communicate with the drain space via the oil drain passage formed inside of the spool.

The technology of Patent Literature 1 describes a respiration-use passage, which leads drain oil from the oil drain passage to a high magnetic flux density portion, being provided as a straight passage hole extending along the axial direction. The high magnetic flux density portion is one of the space gaps adjacent to both the sides of the plunger in the axial direction and exhibits a high magnetic flux density so as to give magnetic attraction power to the plunger. The movement of the spool valve therefore causes the oil (discharged drain oil) to discharge to the oil drain passage and then reach the high magnetic flux density portion smoothly; this permits foreign matter contained in the drain oil to also reach the high magnetic flux density portion easily.

Since the high magnetic flux density portion provides the high magnetic flux density, the portion tends to receive influence of the foreign matter. The foreign matter reaching the high magnetic flux density portion may involve slide abrasion or slide defect in the plunger.

SUMMARY

It is an object of the present disclosure to provide an electromagnetic spool valve which helps prevent foreign matter from reaching a high magnetic flux density portion which tends to receive an influence of foreign matter.

To achieve the above object, according to an aspect of the present disclosure, an electromagnetic spool valve is provided as comprising an electromagnetic actuator and a spool valve combined with the electromagnetic actuator in an axial direction. The electromagnetic actuator includes a plunger that is driven to an axial direction by magnetic force. The spool valve includes a spool that is driven to the axial direction by the plunger. Both axial sides of the plunger are facing respective space gaps, the space gaps communicating with a drain space via an oil drain passage formed inside of the spool. One of the space gaps is a high magnetic flux density portion having a high magnetic flux and providing magnetic attraction power to the plunger. A drain oil led from the oil drain passage to the high magnetic flux density portion is hindered by (i) a pipe, (ii) a hollow shaft, and (iii) a ring-shaped collar. The pipe is provided at an end of the spool as being penetrating, the end being on a side of the pipe facing the electromagnetic actuator. The hollow shaft has a hollow interior and is provided as being sandwiched in between the plunger and the spool. The ring-shaped collar increases the magnetic attraction power of the plunger.

Under the above configuration, the flow of the drain oil from the oil drain passage to the high magnetic flux density portion can be inhibited or obstructed by the pipe at the end of the spool, the hollow shaft in between the plunger and the spool, and the "collar which strengthens magnetic attraction power of the plunger. This can help prevent foreign matter from reaching the high magnetic flux density portion which is easy to be affected by the influence of the foreign matter. This results in decreasing the slide abrasion and the slide defect in the plunger and improving the reliability of the electromagnetic spool valve.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Embodiments according to the present disclosure will be explained with reference to the drawings.

Figure 1:
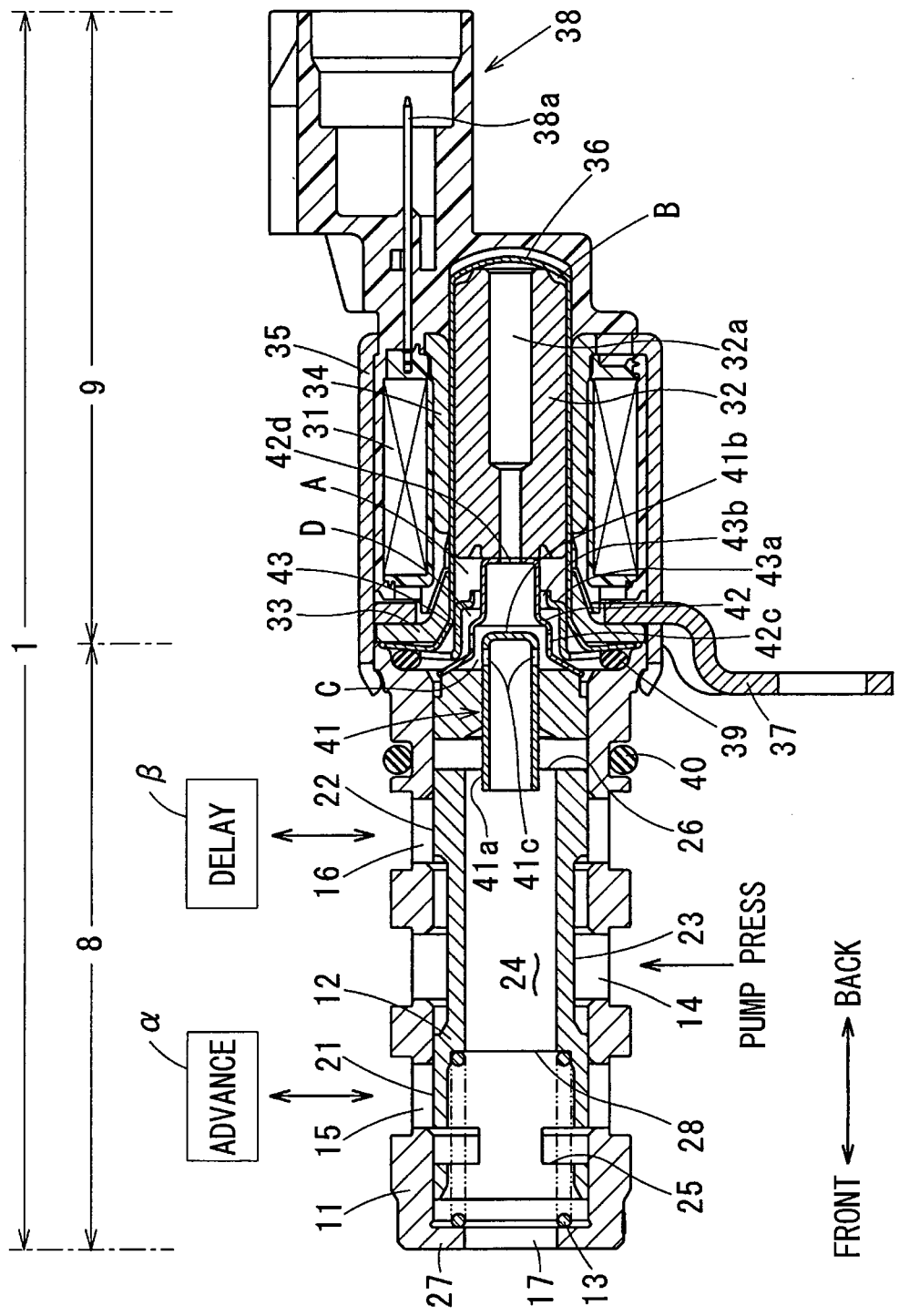
FIG. 1 is a sectional view of an oil control valve along an axial direction according to a first embodiment of the present disclosure.

It is noted that although FIG. 1 illustrates "FRONT on the left-hand side and "BACK" on the right-hand side, this front-and-back direction is only used for explanation and does not limit a direction for actual installation or mounting.

[First Embodiment]

A first embodiment will be explained with reference to FIG. 1 to FIG. 3. This embodiment is directed to an OCV (oil control valve) 1 of a hydraulic VVT (variable valve timing apparatus).

(Explanation of VVT)

The VVT is mounted in an engine for vehicle traveling. The VVT includes: (i) a VCT (variable cam shaft timing mechanism) 2 attached to a cam shaft to continuously vary an advance angle of the cam shaft for continuously varying opening and closing timing of the valve; (ii) a hydraulic circuit 3 that performs hydraulic control of the VCT 2 using the OCV 1; and (iii) an ECU (engine control unit) 4 which controls the OCV 1 electrically.

The VCT 2 includes a shoe housing 5 that is rotated in synchronization with the crankshaft of the engine, and a vane rotor 6 that rotates integrally with the cam shaft. Driving the vane rotor 6 relatively to the shoe housing 5 permits the change of the cam shaft in the advance angle side or the delay angle side.

The vane rotor 6 is rotatable within a predetermined angle relative to the shoe housing 5. The vane rotor 6 includes a vane 6a which divides an interior space of the shoe housing 5 into an advance angle chamber a and a delay angle chamber β. The advance angle chamber α and the delay angle chamber β are oil pressure chambers for driving the vane 6a to the advance angle side and the angle of delay side, respectively.

(Explanation of Hydraulic Circuit 3)

The hydraulic circuit 3 supplies oil to or discharges oil from the advance angle chamber α and the angle of delay chamber β, and functions as a means which produces an oil pressure difference between the advance angle chamber α and the delay angle chamber β to thereby rotate the vane rotor 6 relative to the shoe housing 5. The hydraulic circuit 3 includes the OCV 1. The OCV 1 supplies a pump oil pressure to one of the advance angle chamber α and the delay angle chamber β while metering; the pump oil pressure is produced by the oil that is pressure-fed from an oil pump 7 driven with the crankshaft. The OCV 1 can discharge the oil pressure from the advance angle chamber α or the delay angle chamber β while metering.

The OCV 1 is an electromagnetic spool valve, which combines (i) the spool valve 8 that has a four way valve and (ii) an electromagnetic actuator 9 that drives the spool valve 8, in the axial direction. The spool valve 8 is inserted into an inside of an OCV mounting hole (hole the inner wall of which has a cylindrical shape) formed in an engine part such as a cylinder head; the electromagnetic actuator 9 is fixed to an engine part.

(Explanation of Spool Valve 8)

The spool valve 8 includes: (i) a sleeve 11 that is inserted into the OCV mounting hole provided in the engine part; (ii) a spool 12, which is supported inside of the sleeve 11 slidably in the axial direction and adjusts the communicating state of each port; and (iii) a return spring 13 which biases the spool 12 backward (i.e., to the back side).

The sleeve 11 has an approximately cylindrical shape; the outer peripheral surface of the sleeve 11 is inserted into the interior of the OCV mounting hole with microscopic clearance. The sleeve 11 contains a sliding hole of which the inner peripheral surface supports the spool 12 slidably in the axial direction.

The sleeve 11 is provided with more than one input/output port. To be specific, the sleeve 11 includes, in the radial direction, an input port 14 which receives supply of operating oil discharged from the oil pump 7; an advance angle port 15 which leads to the advance angle chamber α; and a delay angle port 16 which leads to the delay angle chamber β. The ports in the radial direction are arranged from the front side of the sleeve 11 in the following order of the advance angle port 15, the input port 14, and the delay angle port 16. In contrast, a drain port 17 is provided in the front end of the sleeve 11; the drain port 17 leads to a drain space (space which leads to a drain pan.

The spool 12 has an approximately cylindrical shape; the outer peripheral surface of the spool 12 is inserted into the inner peripheral surface of the sleeve 11 with microscopic clearance. As the spool 12 displaces from the back side to the front side, the switching states of the respective ports change so as to achieve a delay angle state (for driving the cam shaft to the delay angle side), a hold state (for holding the advance angle of the cam shaft), and an advance angle state (for driving the cam shaft to the advance angle side).

The outer periphery of the spool 12 is provided with a first land 21 (large diameter portion) and a second land 22 (large diameter portion). The first land 21 and the second land 22 occlude the advance angle port 15 and the delay angle port 16, respectively, in the state that the spool 12 is being driven at an intermediate position in the axial direction with respect to the sleeve 11.

Further, the outer periphery of the spool 12 is provided with an all-round groove 23 (small diameter portion) in between the first land 21 and the second land 22. This all-round groove 23 constantly communicates with the input port 14, and functions as a distribution chamber; the distribution chamber is (i) for increasing the oil pressure of the advance angle chamber a by permitting the input port 14 to communicate with the advance angle port 15 when the spool 12 moves frontward, and (i) for increasing the oil pressure of the delay angle chamber β by permitting the input port 14 to communicate with the delay angle port 16 when the spool 12 moves backward.

The spool 12 having an approximately cylindrical shape, as mentioned above, internally contains an oil drain passage 24, which extends in the axial direction and constantly communicates with the drain port 17.

The spool 12 is further provided with an advance-angle-use discharge port 25 on the front side of the first land 21; the discharge port 25 penetrates in the radial direction. This advance-angle-use discharge port 25, when the spool 12 is moved to the back, permits the advance angle port 15 to communicate with the oil drain passage 24 and thereby decreases the oil pressure of the advance angle chamber α.

The spool 12 is further provided with a delay-angle-use discharge port 26 on the back side of the second land 22; the discharge port 26 penetrates in the radial direction. This delay-angle-use discharge port 26, when the spool 12 is moved to the front, permits the delay angle port 16 to communicate with the oil drain passage 24 and thereby decreases the oil pressure of the delay angle chamber β.

The return spring 13 is a compression coil spring which biases the spool 12 towards the back. The sleeve 11 is provided with a spring seat 27, which is vertical to the axial direction, around the periphery of the drain port 17. The return spring 13 is assembled in the state of being compressed in the axial direction in between the spring seat 27 and a spring receiver step 28 provided in the spool 12; the spring receiver step 28 is a step of a portion, which is positioned on the front side of the oil drain passage 24 and enlarges a diameter frontward. The spring chamber accommodating the return spring 13 constantly communicates with the drain space via the drain port 17. The spring chamber is a chamber which is provided in the front portion of the spool 12 and whose volume is variable.

(Explanation of Electromagnetic Actuator 9)

The electromagnetic actuator 9 includes a coil 31, a plunger 32, a magnetic attraction stator 33, a magnetic delivery stator 34, a yoke 35, a cup guide 36, a stay 37, and a connector 38. The coil 31 is a magnetic force generating means, when an electric current is applied, to generate a magnetic force for carrying out magnetic attraction of the plunger 32; the coil 31 is formed by winding insulating-coating wires around a coil bobbin made of resin.

The plunger 32 is a column body formed with magnetic metal such as iron that is ferromagnetic material constituting a magnetic circuit. The plunger 32 drives the spool 12 frontward using a magnetic force generated by the coil 31 to thereby counteract the biasing force of the return spring 13. The plunger 32 is slidably supported in the axial direction in the inner surface of the cup guide 36.

The magnetic attraction stator 33 provides magnetic attraction to attract the plunger 32 to the front, and is a magnetic metal (for example, iron: ferromagnetic material which constitutes a magnetic circuit); the stator 33 includes (i) a disk portion inserted in between the sleeve 11 and the coil 31 and (ii) a cylindrical portion which leads the magnetic flux of the disk portion towards a vicinity of the plunger 32. The magnetic attraction gap is formed in between the plunger 32 and the magnetic attraction stator 33.

The magnetic delivery stator 34 delivers and receives the magnetism in the radial direction with the plunger 32 via the cup guide 36, and is formed of a magnetic metal (for example, iron: ferromagnetic material which constitutes a magnetic circuit); the stator 34 has a cylindrical shape to cover the outer periphery of the plunger 32 via the cup guide 36 and be inserted into the inner periphery of the coil bobbin.

The yoke 35 is a magnetic metal (for example, iron: ferromagnetic material which constitutes a magnetic circuit) and has a cylindrical shape to cover the outer periphery of the coil 31. The yoke 35 includes a plastic-deformation-use pawl portion at a front end; the pawl portion is swaged to combine with the sleeve 11. In the drawing, the magnetic delivery stator 34 and the yoke 35 are provided as one body or integral one. There is no need to be limited thereto.

The cup guide 36 is a means to partition a range where oil is led inside of the electromagnetic actuator 9 in order to prevent the oil (respiration-use oil) in the electromagnetic actuator 9 from leaking to an exterior of the electromagnetic actuator 9. The cup guide 36 is formed of nonmagnetic material (for example, stainless steel etc.) which has a cup shape. The cup guide 36 includes a flange portion, which spreads in the radial direction, at the front end. The flange portion spreading is inserted in between the magnetic attraction stator 33 and the sleeve 11 (in specific, an O ring 39 located at the back end of the sleeve 11); this accomplishes the seal of the cup guide 36 to the inner side and outer side. The O ring 40 located at the back outer periphery of the sleeve 11 prevents the oil from leaking from the OCV mounting hole.

The stay 37 is a means to fix the OCV 1 to the engine part. The connector 38 is a connection means formed by some secondary molding resin which is used for resin molding of the coil 31. The connector 38 internally contains a terminal 38a connected with a lead end of the coil 31. One end of the terminal 38a is secondary resin molded in the state of being inserted in the coil bobbin; the other end is exposed inside of the connector 38.

(Explanation of Means for Preventing Foreign Matter from Reaching Plunger 32)

As mentioned above, the plunger 32 slides inside of the cup guide 36 in the axial direction. In order to move or slide the plunger 32 in the axial direction, the volumetric capacity of the high magnetic flux density portion A contacting the front end of the plunger 32 needs to vary, and the volumetric capacity of the low magnetic flux density portion B contacting the back end of the plunger 32 needs to vary. The high magnetic flux density portion A is a space gap facing a first axial side that is one side of both the axial sides of the plunger 32 (i.e., in the axial direction); the portion A provides a high magnetic flux density in order to give magnetic attraction power to the plunger 32. The low magnetic flux density portion B is a space gap facing a second axial side that is the other side of both the axial sides of the plunger 32. The high magnetic flux density portion A in the first axial side is closer to the spool 12 than the low magnetic flux density portion B.

The outer periphery of the plunger 32 is occluded by the cup guide 36 as mentioned above. Therefore, the high magnetic flux density portion A and the low magnetic flux density portion B communicate with the drain space via the oil drain passage 24 formed inside of the spool 12.

Now, the drain oil, which contains foreign matter, is discharged to an interior of the oil drain passage 24 from the advance angle port 15 and the delay angle port 16. The OCV 1 of the present embodiment is provided with three flow hindrance means to hinder smooth flow of the drain oil, as means which prevents the foreign matter from reaching the high magnetic flux density portion A.

(Explanation of First Flow Hindrance Means)

A first flow hindrance means is provided as a cylindrical pipe 41 penetrating a back end of the spool 12. This pipe 41 is fixed to the internal wall surface of a through hole by fastening means, such as press fit; the through hole extends in the axial direction and is provided in a center of the back end of the spool 12. The back end of the pipe 41 facing the plunger 32 (i.e., the plunger side) is occluded; the front end of the pipe 41 opens to an interior of the oil drain passage 24.

To be specific, the outside diameter size of the pipe 41 is provided to be smaller than the inside diameter size of the oil drain passage 24. In addition, in the state of being fixed to the spool 12, the pipe 41 includes an inside projecting portion 41a projected to an interior of the oil drain passage 24, and an outside projecting portion 41b projected to the back side from the back end of the spool 12.

The inside projecting portion 41a is an extending portion to extend to an interior of the oil drain passage 24 that prevents the drain oil, which is discharged from the delay-angle-use discharge port 26 to the oil drain passage 24, from directly flowing to an interior of the pipe 41. The front end position of the inside projecting portion 41a (that is, front end position of the pipe 41) is provided to be anterior to the front end position of the delay-angle-use discharge port 26. In contrast, the outside projecting portion 41b is provided with one or more than one first aperture 41c that penetrates in the radial direction while permitting an interior of the pipe 41 to communicate with a first space C surrounding the pipe 41.

The drain oil in the oil drain passage 24 and pipe 41 flows in the axial direction; however, when the drain oil passes through the first aperture 41c, the pipe 41 changes the flow direction of the drain oil to the radial direction to move toward the second hindrance means. Thus, the pipe 41 bends the flow of the drain oil, hindering the smooth flow of the drain oil which moves from the oil drain passage 24 to the high magnetic flux density portion A. This can prevent the foreign matter contained in the drain oil from reaching the high magnetic flux density portion A (i.e., a second flow hindrance means in the present embodiment).

(Explanation of Second Flow Hindrance Means)

A second flow hindrance means is provided as a hollow shaft 42 in between the plunger 32 and the spool 12. The hollow shaft 42 transmits an axial force of the plunger 32 to the spool 12, and forms a first space C and a second space D with the pipe 41 (i.e., the outside projecting portion 41b) and the collar 43, respectively; the spaces permit the drain oil to flow.

To be specific, the hollow shaft 42 is a hollow or ventricular pressed member made of nonmagnetic material (for example, stainless steel); the hollow shaft 42 has a two-step pipe shape that includes (i) a large-diameter pipe portion 42a surrounding the outer periphery of the pipe 41 (i.e., the outside projecting portion 41b) with a gap and (ii) a small-diameter pipe portion 42b, which has a smaller diameter than that of the large-diameter pipe portion 42a and is posterior to the large-diameter pipe portion 42a. The front end of the hollow shaft 42 makes contact with the back end of the spool 12; the back end of the hollow shaft 42 makes contact with the front end of the plunger 32. This configuration transmits an axial force of the plunger 32 to the spool 12, and transmits a biasing force of the return spring 13 to the plunger 32.

The large-diameter pipe portion 42a is provided with one or more than one second aperture 42c penetrating in the radial direction to permit an interior of the hollow shaft 42 (i.e., the first space C) in communication with the second space D surrounding the hollow shaft 42. The second aperture 42c is provided to be displaced from the first aperture 41c in the axial direction (or in the circumferential direction). That is, the drain oil, which passes through the first aperture 41c, does not enter directly the second aperture 42c. Displacing the first aperture 41c and the second aperture 42c from each other in the axial direction (or in the circumferential direction) permits the flow direction of the drain oil, which passes through the first aperture 41c in the radial direction, to change or turn before reaching the second aperture 42c and then pass through the second aperture 42c, thereby moving toward a third flow hindrance means.

Thus, the hollow shaft 42 bends the flow of the drain oil, hindering the smooth flow of the drain oil which moves from the oil drain passage 24 to the high magnetic flux density portion A. This can prevent the foreign matter contained in the drain oil from reaching the high magnetic flux density portion A (i.e., a third flow hindrance means in the present embodiment). (Explanation of Third Flow Hindrance Means)

A third hindrance means is provided as a collar 43 located on the front side of the plunger 32. The collar 43 is a magnetic member made of magnetic material having a circular ring shape. The collar 43 is inserted into inside of the magnetic attraction stator 33 (to be specific, into inside of the cup guide 36) and faces the front end of the plunger 32, to increase the magnetic attraction power of the plunger 32. The magnetic metal is, for example, ferromagnetic material such as iron which constitutes a magnetic circuit.

The collar 43 is provided with a circular or ring-shaped collar inner-diameter portion 43a which approaches the small-diameter pipe portion 42b of the hollow shaft 42 from an outer diameter side. The second space D in between the hollow shaft 42 and the collar 43 communicates with the high magnetic flux density portion A via a third aperture 43b formed in between the collar inner-diameter portion 43a and the small-diameter pipe portion 42b.

To that end, the drain oil changes the flow direction as follows: passing through the second aperture 42c in the radial direction; flowing from the second aperture 42c to the third aperture 43b in the axial direction (backward); changing the flow to go inwardly in the radial direction by the collar inner-diameter portion 43a; and changing the flow, when passing through the third aperture 43b, to go in the axial direction. Thus, the collar 43 bends the flow of the drain oil, hindering the smooth flow (e.g., straight-lined flow) of the drain oil which moves from the oil drain passage 24 to the high magnetic flux density portion A. This can prevent the foreign matter contained in the drain oil from reaching the high magnetic flux density portion A.

Figure 2:
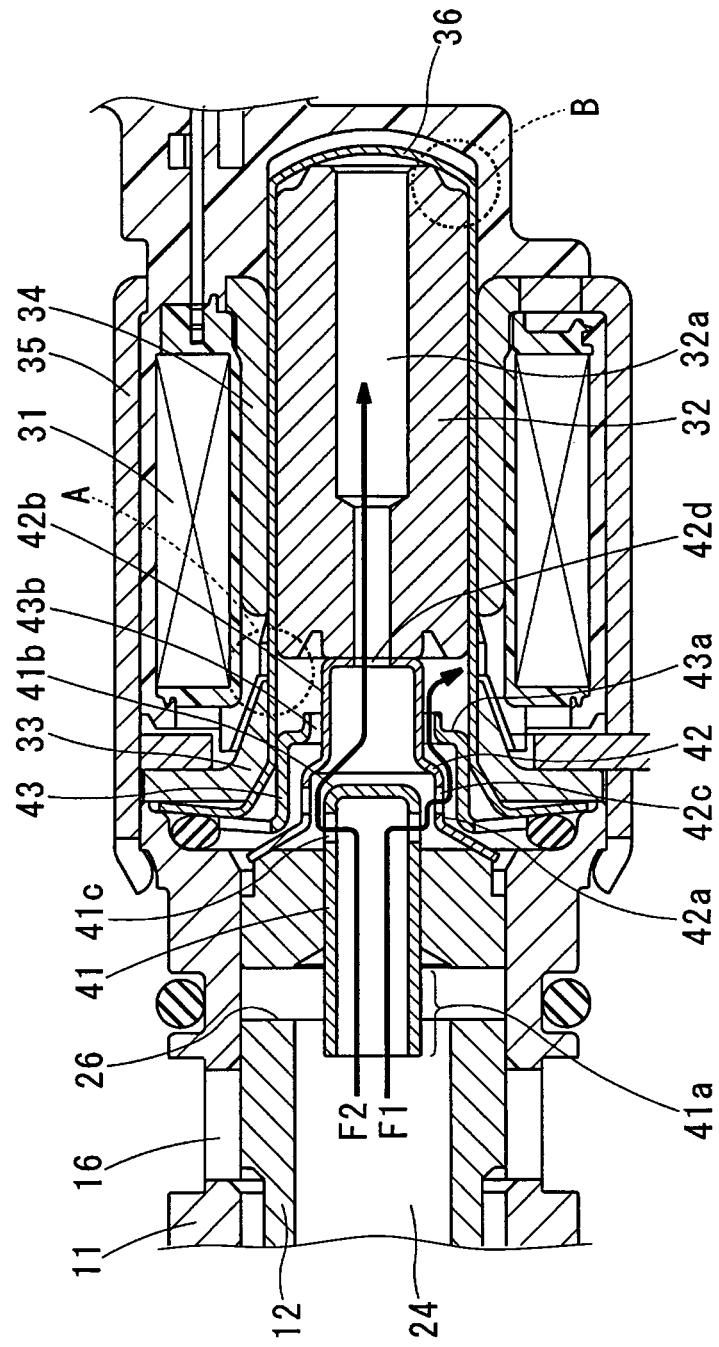
FIG. 2 is a sectional view of a main part of the oil control valve.
Figure 3:
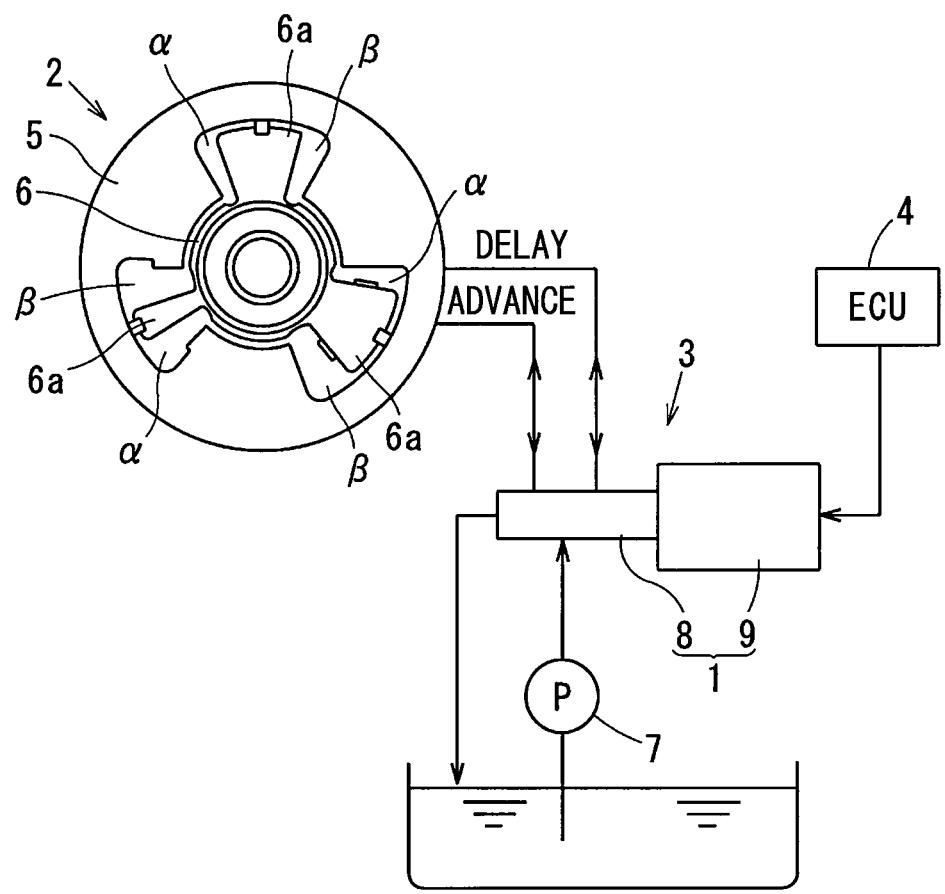
FIG. 3 is a schematic view of a variable valve timing apparatus according to the first embodiment.

Furthermore, the collar inner-diameter portion 43a functions as a partitioning wall (trap wall) which prevents the foreign matter from passing through. The collar inner-diameter portion 43a stops or retains the foreign matter, which arrived at the second space D, inside of the second space D; this prevents the foreign matter which has reached the second space D, from entering the high magnetic flux density portion A.

it is noted that a first respiration passage F1 is defined as leading the drain oil from the oil drain passage 24 to the high magnetic flux density portion A; the passage F1 includes, in sequence, the pipe 41->the first aperture 41c->the first space C->the second aperture 42c->the second space D->third aperture 43b->the high magnetic flux density portion A (refer to the arrow in FIG. 2).

[Effect 1 of First Embodiment]

In the OCV 1 according to the present embodiment, even when foreign matter accompanying the drain oil discharges into the oil drain passage 24 and then flows backwardly, any one of three flow hindrance means helps prevent such foreign matter from reaching the high magnetic flux density portion A. Three flow hindrance means include the pipe 41 as a first flow hindrance means, the hollow shaft 42 as a second flow hindrance means, and the collar 43 as a third flow hindrance means.

Thus, the pipe 41, the hollow shaft 42, and/or the collar 43 helps prevent the foreign matter from reaching the high magnetic flux density portion A that is easy to be affected by the influence of the foreign matter; this prevents an occurrence of the slide abrasion and/or the slide defect of the plunger 32. Thereby, the reliability of OCV 1 can be improved and the reliability of VVT can be improved eventually.

[Effect 2 of First Embodiment]

The OCV 1 of the present embodiment provides the pipe 41 serving as the first flow hindrance means in between the oil drain passage 24 and the low magnetic flux density portion B. To be specific, the present embodiment provides an axial hole 42d in a center portion of the back end of the hollow shaft 42; the axial hole 42d communicates only with an in-plunger respiration hole 32a (communication hole which penetrates in the front-and-back direction around the axis). This permits communication between the low magnetic flux density portion B and the first space C via the in-plunger respiration hole 32a.

Therefore, the pipe 41 hinders or interferes with the flow of the drain oil which goes to the low magnetic flux density portion B from the oil drain passage 24; this can help prevent the foreign matter contained in the drain oil from reaching the low magnetic flux density portion B.

It is noted that a second respiration passage F2 is defined as leading the drain oil from the oil drain passage 24 to the low magnetic flux density portion B; the passage F2 includes, in sequence, the pipe 41->the first aperture 41c->the first space C->the axial hole 42d->the in-plunger respiration hole 32a->the low magnetic flux density portion B (refer to the arrow in FIG. 2).

The second respiration passage F2 from the oil drain passage 24 to the low magnetic flux density portion B includes the flow hindrance means fewer than those of the first respiration passage F1 from the oil drain passage 24 to the high magnetic flux density portion A. Therefore, the second respiratory channel F2 does not provide a significant effect of suppressing the transit or movement of the foreign matter, as compared with the first respiration passage F1. However, the magnetic flux density portion B has a low magnetic flux density, and thus receives less influence of the foreign matter. Therefore, even if a small amount of foreign matter reaches the low magnetic flux density portion B, the slide abrasion or slide defect of the plunger 32 can be prevented from occurring.

[Second Embodiment]

Figure 4:
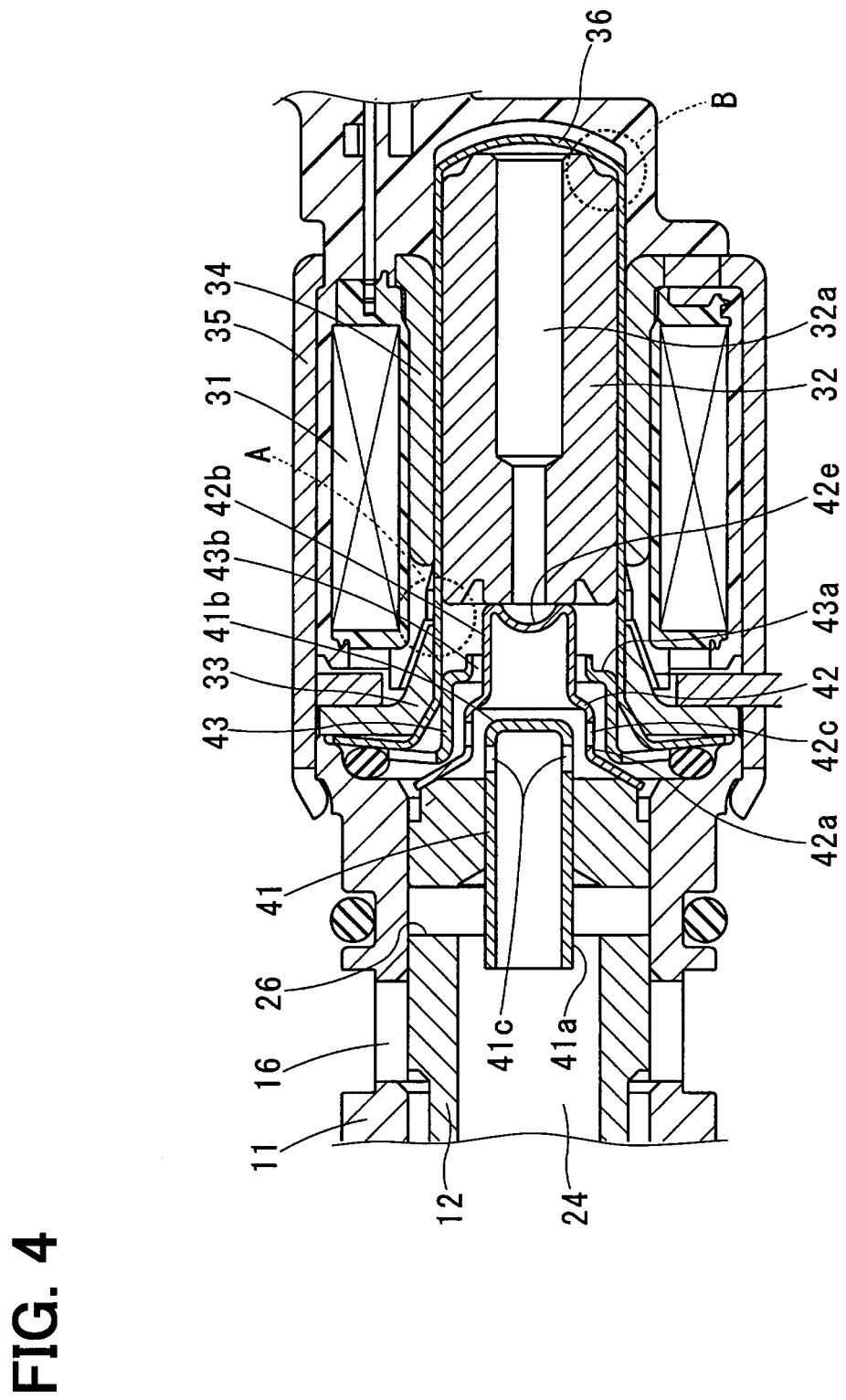
FIG. 4 is a sectional view of a main part of an oil control valve according to a second embodiment of the present disclosure.

The following will explain a second embodiment with reference to FIG. 4. The first embodiment provides an example where the first space C and the in-plunger respiration hole 32a communicate with each other via the axial hole 42d. Alternatively, the second embodiment eliminates an axial hole 42d, and permits the high magnetic flux density portion A in communication with the in-plunger respiration hole 32a.

To be specific, the back end of the hollow shaft 42 is occluded; a radial cave 42e is provided at a back face of the hollow shaft 42; the radial cave 42e extends radially. The high magnetic flux density portion A and the in-plunger respiration hole 32a communicate with each other via the radial cave 42e. This more certainly prevents foreign matter from reaching the low magnetic flux density portion B.

The above embodiments provide the sleeve 11; alternatively, the spool valve 8 may be designed not to use a sleeve 11. That is, the spool 12 may be inserted into an interior of a spool sliding hole in a member (e.g., valve body) provided in an oil flow channel, thereby constituting a spool valve 8.

The above embodiments direct the present disclosure at the OCV 1 of the VVC. The present disclosure may be directed at an electromagnetic spool valve having an intended use other than that of the VVT.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An electromagnetic spool valve comprising:
an electromagnetic actuator which includes a plunger that is driven in an axial direction by magnetic force; and
a spool valve combined with the electromagnetic actuator in the axial direction, the spool valve including a spool that is driven in the axial direction by the plunger,
wherein:
one axial side of the plunger faces a first space gap, and another axial side of the plunger faces a second space gap, the first and second space gaps each communicating with a drain space via an oil drain passage formed inside of the spool;
the first space gap is a first magnetic flux density portion, which has a first magnetic flux higher than a second magnetic flux of the second space gap, the first magnetic flux density portion providing magnetic attraction power to the plunger; and
a drain oil from the oil drain passage to the first magnetic flux density portion is hindered by
(i) a pipe provided at an end of the spool, the pipe penetrating the end of the spool, the end being on a side of the pipe facing the electromagnetic actuator,
(ii) a hollow shaft, which has a hollow interior and is sandwiched between the plunger and the spool, and
(iii) a ring-shaped collar which increases the magnetic attraction power of the plunger.

2. The electromagnetic spool valve according to claim 1, wherein:
the pipe includes an outside projecting portion that projects from the spool toward the plunger, an end of the outside projecting portion being occluded, the end being on a side of the pipe facing the plunger;
the outside projecting portion includes a first aperture, the first aperture penetrating in a radial direction and permits an interior of the pipe to communicate with a first space, which is outside of the pipe; and
the pipe interferes with a flow of the drain oil which moves from the oil drain passage to the first magnetic flux density portion.

3. The electromagnetic spool valve according to claim 2, wherein:
the hollow shaft includes a first diameter pipe portion that covers the outside projecting portion;
the first diameter pipe portion includes a second aperture, which penetrates in a radial direction and permits an interior of the hollow shaft to communicate with a second space that is outside of the hollow shaft; and
the hollow shaft interferes with a flow of the drain oil, which moves from the oil drain passage to the first magnetic flux density portion.

4. The electromagnetic spool valve according to claim 3, wherein:
the collar includes a circular collar inner-diameter portion, which nears a second diameter pipe portion of the hollow shaft from an outer diameter side, the second diameter pipe portion having, a smaller diameter than the first diameter pipe portion; and
the collar interferes with a flow of the drain oil which moves from the oil drain passage to the first magnetic flux density portion.

5. The electromagnetic spool valve according to claim 1, wherein:
the second space gap is a second magnetic flux density portion, which has the second magnetic flux that is lower than the first magnetic flux of the first space gap;
the hollow shaft includes an axial hole at a portion that makes contact with the plunger, the axial hole communicating with an in-plunger respiration hole that penetrates the plunger; and
a drain oil from the pipe into the hollow shaft flows to the second magnetic flux density portion via the in-plunger respiration hole.

6. The electromagnetic spool valve according to claim 1, wherein the oil drain passage is configured to be a drain oil discharge passage that allows a drain oil, which is discharged via an output port of the spool valve, to flow the drain space.

* * * * *